United States Patent
Diegmann et al.

(10) Patent No.: US 10,659,201 B2
(45) Date of Patent: May 19, 2020

(54) METHOD FOR ASSIGNING AN INPUT CHANNEL AS WELL AS SIGNAL ANALYZER

(71) Applicant: Rohde & Schwarz GmbH & Co. KG, Munich (DE)

(72) Inventors: Philip Diegmann, Munich (DE); Moritz Pfefferkorn, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 90 days.

(21) Appl. No.: 15/599,077

(22) Filed: May 18, 2017

(65) Prior Publication Data
US 2018/0337754 A1 Nov. 22, 2018

(51) Int. Cl.
*H04W 72/02* (2009.01)
*H04W 24/00* (2009.01)
*H04L 5/00* (2006.01)
*H04L 1/24* (2006.01)
*H04L 1/00* (2006.01)

(52) U.S. Cl.
CPC .............. *H04L 5/0044* (2013.01); *H04L 1/24* (2013.01); *H04L 5/0058* (2013.01); *H04W 72/02* (2013.01); *H04L 1/0045* (2013.01); *H04L 2001/0094* (2013.01); *H04W 24/00* (2013.01)

(58) Field of Classification Search
CPC ... H04L 1/0044; H04L 1/0058; H04L 25/067; H04L 1/0045; H04L 27/2647; H04L 1/005; H04L 1/0054; H04L 5/0044; H04L 5/0058; H04L 1/24; H04W 72/02; H04W 24/00
See application file for complete search history.

(56) References Cited

U.S. PATENT DOCUMENTS

| | | | | |
|---|---|---|---|---|
| 6,791,995 | B1 * | 9/2004 | Azenkot | H04B 1/707 348/E5.008 |
| 2004/0233076 | A1 * | 11/2004 | Zhou | H03M 7/425 341/67 |
| 2006/0126028 | A1 * | 6/2006 | Ullman | G03B 21/28 353/69 |
| 2009/0228284 | A1 * | 9/2009 | Moon | G10L 19/035 704/500 |
| 2010/0246653 | A1 * | 9/2010 | Ronte | G01R 23/16 375/224 |

FOREIGN PATENT DOCUMENTS

CN 105372468 A 3/2016

* cited by examiner

*Primary Examiner* — Ted M Wang
(74) *Attorney, Agent, or Firm* — Christensen O'Connor Johnson Kindness PLLC

(57) ABSTRACT

A method for assigning an input channel of a signal analyzer to a signal decoder has the steps of analyzing a digital representation of a signal received by an input channel and generating a characteristic signal parameter of the signal. The parameter is compared to expected values and the corresponding input channel is assigned to the signal decoder according to the result of the comparison. Further, a signal analyzer for measuring a bus signal is shown.

19 Claims, 1 Drawing Sheet

METHOD FOR ASSIGNING AN INPUT CHANNEL AS WELL AS SIGNAL ANALYZER

FIELD OF THE DISCLOSURE

Embodiments of the present disclosure relate generally to a method for assigning an input channel of a plurality of input channels of a signal analyzer to a signal decoder of the signal analyzer as well as a signal analyzer for measuring a bus signal.

BACKGROUND

Bus signals comprise at least one signal line for a data signal and usually a signal line for a clock signal as well. The data signal and the clock signals have different purposes and have to be treated differently in order to decode the bus signal correctly.

When measuring a bus signal, the signal lines of the bus signal are connected to input channels of a signal analyzer for decoding the bus signal. For a correct measurement, it is important that the input channels are assigned, i.e. connected, correctly to the decoder, i.e. that the input channel receiving the data signal is assigned to a data input of the signal decoder and that the input channel receiving the clock signal, if present, is assigned to the clock input of the signal decoder.

This assignment is usually done by choosing the correct wiring manually, which is tedious and prone to errors.

SUMMARY

Thus, there is a need for a quick and reliable way of assigning the input channel to the input channels of the signal decoder.

To address this need, among others, the present disclosure provides a method for assigning an input channel of a plurality of input channels of a signal analyzer to a signal decoder of the signal analyzer, comprising the following steps:
choosing a first input channel of the plurality of input channels,
analyzing a digital representation of a first signal received by the first input channel by generating at least one characteristic signal parameter of the first signal,
performing a check whether the at least one characteristic signal parameter corresponds to an expected value, and
assigning the first input channel to the signal decoder according to the result of the check.

Further, the disclosure provides a signal analyzer for measuring a bus signal, comprising a plurality of input channels, a signal decoder, a multiplexer connecting the input channels to the signal decoder, and a control unit. The signal decoder is configured to receive a digital representation of a first signal received by a first input channel of the plurality of input channels wherein the signal decoder is configured to generate at least one characteristic signal parameter of the first signal. The control unit is configured to receive the characteristic signal parameter from the signal decoder and to perform a check whether the at least one characteristic signal parameter corresponds to an expected value. The control unit is configured to control the multiplexer to assign the first input channel to the signal decoder according to the result of the check. The control unit may be integrated in the signal decoder or is a separate circuit.

The first input channel may be connected to a data line or a clock signal line of a serial bus, like I2C, SPI, CAN, UART or USBx bus. The assignment is done automatically by the signal analyzer and may be changed until characteristic signal parameter corresponds to the expected value. Further, a post-processing unit may be provided for the decoded signal.

Thus, the initial wiring of the input channels to the signal lines of the serial bus is not important and there is no need for manually changing the wiring afterwards. Accordingly, the error rate is reduced and user comfort improved.

The user may simply hit a certain button in order to initiate the automatic assigning.

In an aspect, the first input channel is assigned to one of a data input and a clock signal input of the signal decoder. The signal decoder may be a protocol decoder. This way, the correct connection of the data signal line with the data input of the signal decoder as well as the correct connection of the clock signal line to the clock input signal of the signal decoder is guaranteed.

For example, the input channel is assigned to the signal decoder using a multiplexer. The multiplexer may connect the input channels of the signal analyzer to their assigned input channels of the signal decoder. This way, a reliable and cost efficient way of assigning the input channels is realized. The connecting may be done purely logical, meaning that the multiplexer is integrated into the signal decoder or another circuit.

In an embodiment, the digital representation of the signal is temporarily stored in a memory unit provided between the signal decoder and the multiplexer to increase the reliability of the signal analyzer. For instance, the decoder can obtain data while having access to the memory unit.

In another aspect, the digital representation of the first signal is analyzed using the signal decoder so that no additional units are needed. Accordingly, the signal decoder comprises an analyzing function.

In an embodiment, the check is performed by a control unit of the signal analyzer, the control unit receiving the at least one characteristic signal parameter. Thus, a quick and reliable check is possible.

In an embodiment, a second input channel of the plurality of input channels is chosen and the steps b) to d) are repeated for the second input channel. This way, either another input channel can be correctly assigned for bus signals using more than two lines, the assignment of the first channel may be verified, or, if the assignment of the first channel has failed, another attempt can be made to correctly assign the input channels to the signal decoder. However, the several assignment steps are performed automatically such that no manual input is required.

For a precise and reliable assignment, the expected value may be characteristic of at least one of a data signal, a clock signal, a bus signal, a number of bits, events, and a specific bus type allowing an assignment with high certainty.

For example, the at least one characteristic signal parameter is at least one of a frequency of the signal, a maximum amplitude of the signal, a minimum amplitude of the signal, a decoded bus signal, and a bus load increasing the reliability of assignment even further.

For instance the signal analyzer is at least one of an oscilloscope and a logic analyzer.

In another aspect, the signal decoder outputs a decoded signal, the decoded signal is displayed using a display unit of the signal analyzer providing an efficient means for analyzing the bus signal.

In some embodiments, the decoded signal passes a memory unit provided between the signal decoder and the display unit. The decoded signal may be stored in the memory unit, in particular buffered.

For efficient signal analysis, the signal analyzer comprises at least one analog-to-digital-converter associated with the first input channel for generating the digital representation of the first signal. One analog-to-digital converter may be provided for each input channel of the plurality of input channels. This ensures that analog signals are digitized for further processing, in particular for performing the channel assignment.

In another aspect, at least one memory unit is provided in the signal path between at least one of the signal decoder and the multiplexer as well as between the signal decoder and the display unit. This way, opportunities to temporarily store data are provided increasing the reliability of the signal analyzer. Moreover, a histogram generated by the control unit may be stored in the memory. Post-processing units may retrieve the information stored in the memory for analyzing purposes.

In another embodiment, the signal analyzer may comprise a post-processing unit. The post-processing unit may comprise a visualization unit that is arranged upstream the display unit. Accordingly, the visualization unit may control the data stored in the memory for visualizing purposes such that only data are displayed fulfilling conditions.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
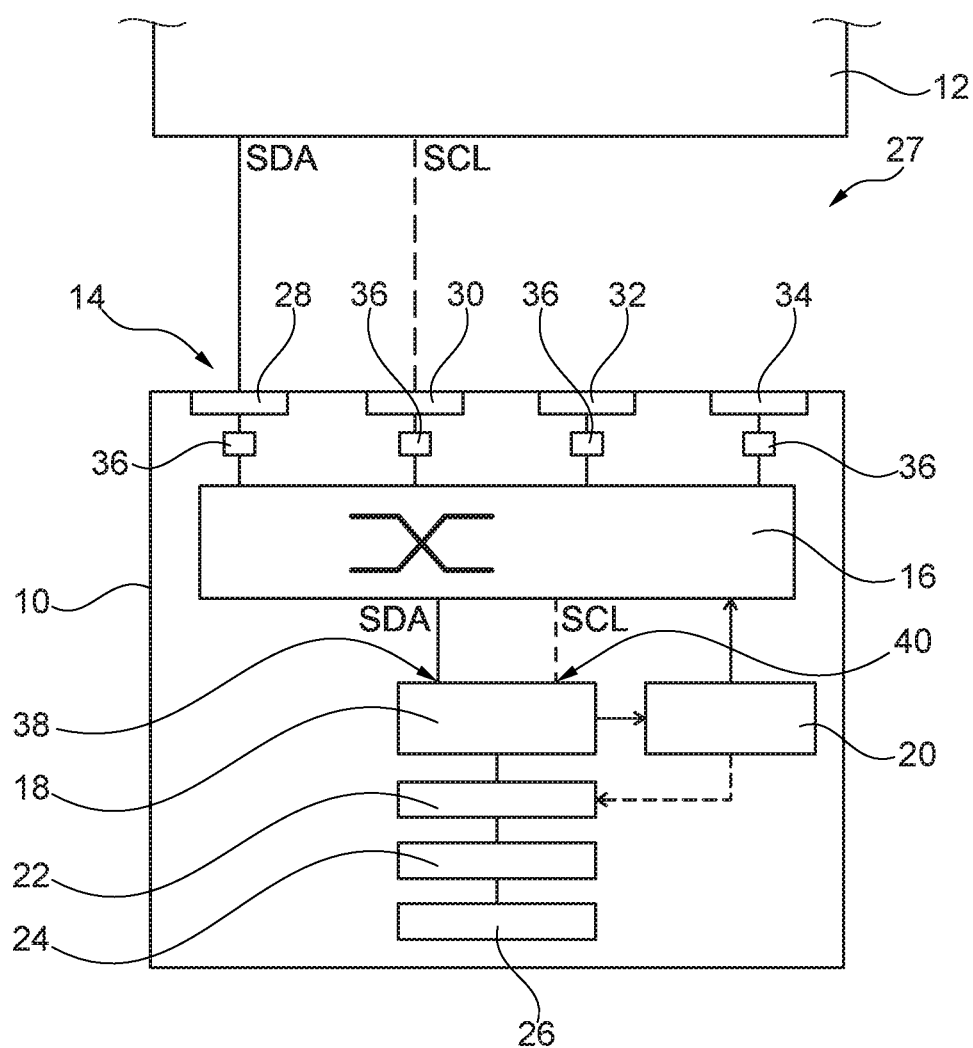
FIG. 1 shows a schematic overview of a first embodiment of a signal analyzer according to an aspect of the disclosure.

FIG. 1 shows a signal analyzer 10 that can be connected to a device under test 12. The device under test 12 comprises a serial bus, for example an I2C, SPI, CAN, UART, or USBx bus or the like. The details of the device under test 12 are not shown in FIG. 1 for the sake of simplicity.

The signal analyzer 10 may be an oscilloscope or a logic analyzer and comprises a frontend 14, a multiplexer 16, a signal decoder 18, a control unit 20, a memory unit 22, a post-processing unit 24, and a display unit 26.

The frontend 14 includes a plurality of input channels 27, in the shown embodiment four input channels 27, namely a first input channel 28, a second input channel 30, a third input channel 32, and a fourth input channel 34. Each of the input channels 27 have an associated input to be connected.

Further, each of the plurality of input channels 27 has an analog-digital-converter 36 associated therewith. Thus, in the shown embodiment, four analog-to-digital converters 36 are provided.

Each of the input channels 27 is connected via their associated analog-to-digital converter 36 to the multiplexer 16. The multiplexer 16 is able to connect any of the input channels 27 with the signal decoder 18. The multiplexer 16 may be a digital multiplexer 16. Further, the multiplexer 16 may be a separate circuit or may be purely logical meaning that the multiplexer 16 may be integrated into the signal decoder 18 or other parts of the signal analyzer 10.

The signal decoder 18 can be established by a protocol decoder that is able to analyze the signals provided to it and comprises at least a data input 38 and a clock signal input 40. In the shown embodiment, the signal decoder 18 is connected to the control unit 20 as well as the memory unit 22.

The control unit 20 is, among others, configured to control the multiplexer 16 in a way that the input channels 27 are assigned, i.e. connected, either to the data input 38 or the clock signal input 40 of the signal decoder 18 depending on the signal fed to the dedicated input channels 27 as will be described later. The control unit 20 controls the multiplexer 16 on the basis of the signals received from the signal decoder 18.

The memory unit 22 is connected to the post-processing unit 24 which is in turn connected to the display 26. The post-processing unit 24 may comprise a visualization unit that is configured to provide data to be displayed being part of the data acquired previously. The data to be displayed may fulfill conditions defined by the post-processing unit 24. It is possible that a display memory (not shown) is provided between the post-processing unit 24 and the display 26 such that post-processed data are stored in the display memory.

For analyzing the bus signal of the device under test 12, the data line SDA and the clock signal line SCL of the bus are connected to one of the input channels 27 of the plurality of input channels each. In the shown embodiment, the data signal line is connected to the first input channel 28 and the clock signal line is connected to the second input channel 30.

For a correct measurement, it is important that the signal of the data signal line is fed to the data input 38 of the signal decoder 18 and that the signal of the clock signal input 40 is transmitted to the clock signal input 40 of the signal decoder 18.

Because it is per se not known which line of the bus is connected to which of the input channels 28, 30 of the signal analyzer 10 by the wiring, the connection or assignment of the input channels 28, 30 of the signal analyzer to the inputs 38, 40 of the signal decoder 18 is done using the multiplexer 16 controlled by the control unit 20.

For assigning the input channels 27 to the inputs 38, 40 of the signal decoder 18, at least one of the input channels 27 is chosen using the multiplexer 16. In the shown embodiment, at first the first input channel 28 is chosen.

The signal received by the first input channel 28, hereinafter the first signal, is converted by the analog-to-digital converter 36 into a digital representation thereof. The digital representation of the first signal is transmitted via the multiplexer 16 to the signal decoder 18.

The signal decoder 18 analyzes the digital representation of the first signal and generates at least one characteristic signal parameter of the first signal. The characteristic signal parameter may be the frequency of the signal, a maximum amplitude of the signal, a minimum amplitude of the signal, a decoded bus signal, a bus load, or other parameters unique for either a data or a clock signal. This determined characteristic signal parameter is then transferred to the control unit 20.

The control unit 20 has access, i.e. via a memory, to a plurality of preset expected values. The expected values are characteristic of at least one of a data signal, a clock signal, a bus signal, a number of bits, events or a specific bus type. For example, the expected value may be the value of a characteristic signal parameter of a clock signal of a specific bus type. The expected values may be specific to the inputs 38, 40 of the signal decoder 18.

The plurality of expected values for different protocols and different signal types of each protocol may be used by the control unit 20 to identify the type and possibly the bus type of the first signal by comparing the characteristic signal parameter of the first signal to the expected values. Accordingly, the control unit 20 provides a comparison unit that compare the obtained value of the characteristic signal parameter with an expected value.

If the first signal and one of the expected values have a high similarity, e.g. a similarity above a certain threshold, it is assumed that the first signal is of the same type as the expected value.

Based on the result of the check, i.e. on the signal type identified to be the signal type of the first signal, the first input channel 28 is assigned via the multiplexer 16 to the corresponding input 38, 40 of the signal decoder 18.

In the shown embodiment, the first signal at the first input channel 28 is a data signal (SDA) and therefore the first input channel 28 is assigned and connected to the data input 38 of the signal decoder 18. For example, the control unit 20 controls the multiplexer 16 accordingly.

However, if the characteristic parameter of the signal does not match any expected value of the input 38, 40 of the signal decoder 18, the corresponding input channel is assigned to another input 38, 40 of the signal decoder until a match between the characteristic parameter and the expected value is achieved.

After one of the input channels 28, 30, 32, 34, here the first input channel 28, has been assigned to one of the inputs 38, 40 of the signal decoder 18, another input channel 30, 32, 34 of the signal analyzer 10 is chosen, for example the second input channel 30.

Then, the second signal received by the second input channel 30, more precisely a digital representation thereof, is fed to the signal decoder 18, where a characteristic parameter of the second signal is generated. This characteristic parameter is then again transferred to the control unit 20 which performs a comparison with expected values and controls the multiplexer in a way to assign the second input channel 30 to the corresponding input 38, 40 of the signal decoder 18.

In the shown embodiment, the second signal is the clock signal (SCL). Thus, the second input channel 30 is assigned to the clock signal input 40 of the signal decoder 18.

Once, all or a sufficient amount of input channels 28, 30, 32, 34 have been assigned to inputs 38, 40 of the signal decoder 18, the signal decoder 18 is able to decode the bus signal.

While decoding, the signal decoder 18 generates a decoded signal which is then transferred and at least temporarily stored in the memory unit 22. Further, the control unit 20 may provide a histogram to the memory unit 22. The decoded signal or any other data of the memory unit 22 may then be transferred directly to the display unit 26 where it is displayed or may pass the post-processing unit 24 beforehand.

The post-processing unit 24 may perform various analysis steps on the decoded signal. Further, the post-processing unit 24 may select portions of the data acquired that is to be displayed by providing data to be displayed.

Due to the automatic assignment, a user of the signal analyzer 10 does not have to check or even rewire the input channels 27 of the signal analyzer 10 in order to obtain the right assignments of the input channels 28, 30, 32, 34 to the inputs 38, 40 of the signal decoder 18.

Figure 2:
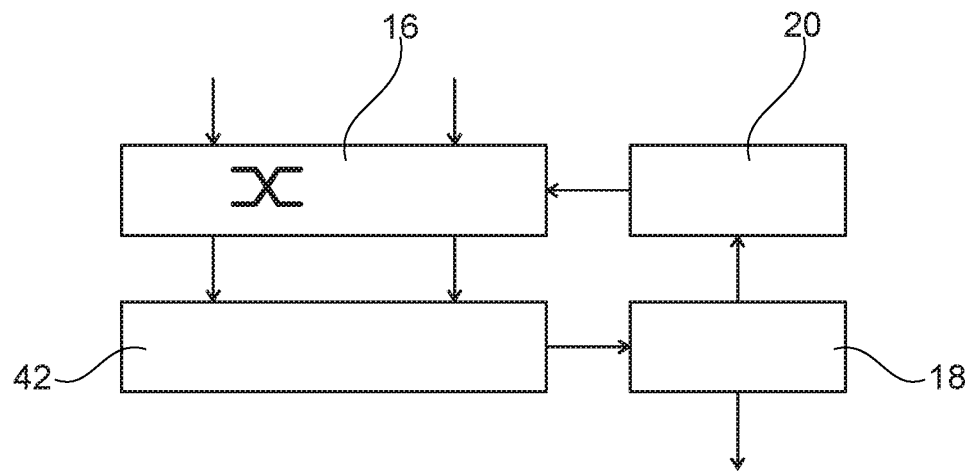
FIG. 2 shows a portion of a signal analyzer according to a second embodiment of the disclosure.

FIG. 2 shows a second embodiment of the signal analyzer 10 in part. The signal analyzer 10 is essentially the same as the one of the first embodiment shown in FIG. 1. Thus, identical parts or parts with the same function are referenced to using the same numerals and only differences between the embodiments are described hereinafter.

In the second embodiment, memory unit 42, in particular an acquisition memory, is provided in the signal path between the multiplexer 16 and the signal decoder 18 for temporarily storing the digital representations of the signals received by the input channels 27. The signal decoder 18 may retrieve more data simultaneously that is stored in the memory unit 42.

In general, the automatic assignment may be initiated by the user of the signal analyzer 10 by hitting a button of the signal analyzer 10, for instance a button displayed in a graphical user interface displayed on the display unit 26. After hitting the dedicated button, the signal analyzer 10 automatically detects a data and a clock signal and assigns the corresponding input channels 27 to the signal decoder 18 in an appropriate manner without the need of a manual action; despite of the initiation.

Accordingly, a signal analyzer 10 as well as a method are provided that ensure a quick and reliable assignment of the input channels 27 to the signal decoder 18.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for assigning an input channel of a plurality of input channels of a signal analyzer to a signal decoder of said signal analyzer, comprising the following steps:

choosing a first input channel of said plurality of input channels;

analyzing a digital representation of a first signal received by said first input channel by generating at least one characteristic signal parameter of said first signal, wherein said at least one characteristic signal parameter of said first signal is at least one of a frequency of said signal, a maximum amplitude of said signal, a minimum amplitude of said signal, a decoded bus signal or a bus load;

performing a check whether said at least one characteristic signal parameter corresponds to an expected value; and assigning said first input channel to said signal decoder according to the result of said check.

2. The method according to claim 1, wherein said first input channel is assigned as one of a data input or a clock signal input of said signal decoder.

3. The method according to claim 1, wherein said digital representation of said first signal is analyzed using said signal decoder.

4. The method according to claim 1, wherein said check is performed by a control unit of said signal analyzer, said control unit receiving said at least one characteristic signal parameter.

5. The method according to claim 1, wherein a second input channel of said plurality of input channels is chosen and said analyzing, said performing, and said assigning are repeated for said second input channel.

6. The method according to claim 1, wherein said expected value is characteristic of at least one of a data signal, a clock signal, a bus signal, a number of bits, events, and a specific bus type.

7. The method according to claim 1, wherein said signal analyzer is at least one of an oscilloscope or a logic analyzer.

8. The method according to claim 1, wherein said signal decoder outputs a decoded signal, said decoded signal is displayed using a display unit of said signal analyzer.

9. The method according to claim 8, wherein said decoded signal passes a memory unit provided between said signal decoder and said display unit.

10. A method for assigning two input channels of a plurality of input channels of a signal analyzer to a signal decoder of said signal analyzer, comprising:

choosing a first input channel of said plurality of input channels;

analyzing a digital representation of a first signal received by said first input channel by generating at least one characteristic signal parameter of said first signal;

performing a check whether said at least one characteristic signal parameter corresponds to an expected value;

assigning said first input channel to said signal decoder according to the result of said check, wherein said first input channel is assigned to said signal decoder using a multiplexer;

choosing a second input channel of said plurality of input channels;

analyzing a digital representation of a second signal received by said second input channel by generating at least one characteristic signal parameter of said second signal;

performing a check whether said at least one characteristic signal parameter corresponds to an expected value;

assigning said second input channel to said signal decoder according to the result of said check, wherein said second input channel is assigned to said signal decoder using a multiplexer; and wherein the first and second input channels are assigned concurrently to the signal decoder.

11. The method according to claim 10, wherein said digital representation of said signal is temporarily stored in a memory unit provided between said signal decoder and said multiplexer.

12. A signal analyzer for measuring a bus signal, comprising:

a plurality of input channels each configured to receive one or more bus signals having two different data types;

a signal decoder configured to receive a digital representation of a first bus signal received by a first input channel of said plurality of input channels, said signal decoder being configured to generate at least one characteristic signal parameter of said first bus signal;

a multiplexer connecting said plurality of input channels to said signal decoder; and control circuitry configured to receive said characteristic signal parameter from said signal decoder and to perform a check whether said at least one characteristic signal parameter corresponds to an expected value, and said control circuitry being configured to control said multiplexer to assign said first input channel to said signal decoder according to the result of said check.

13. The signal analyzer according to claim 12, wherein said signal analyzer comprises at least one analog-to-digital-converter associated with said first input channel for generating said digital representation of said first bus signal.

14. The signal analyzer according to claim 12, wherein said first input channel is assigned as one of a data input or a clock signal channel of said signal decoder.

15. The signal analyzer according to claim 12, wherein said expected value is characteristic of at least one of a data signal, a clock signal, a bus signal, a number of bits, events, or a specific bus type.

16. The signal analyzer according to claim 12, wherein said at least one characteristic signal parameter is at least one parameter selected from the group consisting of a frequency of said signal, a maximum amplitude of said signal, a minimum amplitude of said signal, a decoded bus signal or a bus load.

17. The signal analyzer according to claim 12, wherein said signal analyzer is at least one of an oscilloscope or a logic analyzer.

18. The signal analyzer according to claim 12, further comprising a display unit configured for receiving and displaying a decoded signal from said signal decoder.

19. The signal analyzer according to claim 12, wherein at least one memory unit is provided in the signal path between at least one of said signal decoder and said multiplexer or between said signal decoder and a display unit.

* * * * *